Oct. 29, 1963 G. BOSMAJIAN 3,108,709
POLYMERIZATION AND COATING PROCESSES AND PRODUCTS
Filed Nov. 27, 1959

INVENTOR.
GEORGE BOSMAJIAN
BY
ATTORNEYS

United States Patent Office 3,108,709
Patented Oct. 29, 1963

3,108,709
POLYMERIZATION AND COATING PROCESSES AND PRODUCTS
George Bosmajian, Severna Park, Md., assignor, by mesne assignments, to Cities Service Research and Development Company, New York, N.Y., a corporation of New Jersey
Filed Nov. 27, 1959, Ser. No. 855,492
20 Claims. (Cl. 220—64)

This invention is concerned with the preparation of a copolymer of butadiene and certain olefinic monocarboxylic acids, and the coating of metals therewith.

One of the problems with which the invention is concerned is the protection of metal surfaces against deterioration and particularly against corrosion. Specifically, the invention is utilized in the coating of sheet metals utilized in containers, cans, bottle crowns, screw-top caps, and similar articles. The protective coatings also are useful for metal articles in general.

Numerous prior attempts have been made to prepare and use butadiene polymers and copolymers in forming coatings such as the preparation of can linings, but very few have been found to be acceptable. Thus, in the use of polymers prepared with Friedel-Crafts catalysts such as aluminum chloride, a common deficiency appears in subjecting the product to "boiling water" tests in that apparently residual aluminum chloride is hydrolyzed to aluminum hydroxide, producing a result called blushing in which the coating has a milky or hazy appearance and in some cases a streaked appearance. Other coatings have been prepared from polymers obtained using various catalysts including sodium, peroxides and other catalysts, and such polymers often are not fully satisfactory in that they are either too brittle and fracture in operations such as the can forming operation, or are excessively soft and rubbery, and undergo deformation to such an extent that they are unusable. Also, in some cases, polymers including halogens and acetate radicals have caused difficulty in that in contact with certain can contents these polymers release halogens or acetic acid.

An object of the present invention is to provide a novel copolymer of butadiene and certain olefinic monocarboxylic acids, said polymer having desirable characteristics, and a process of preparing the same.

Another object of this invention is to provide a novel metal article having a resinous coating thereupon prepared from the copolymer of the invention, and a process of preparing such article. Yet another object is to obtain and utilize a liquid or semi-liquid copolymer in accordance with the preceding objects of invention.

Figure 1:
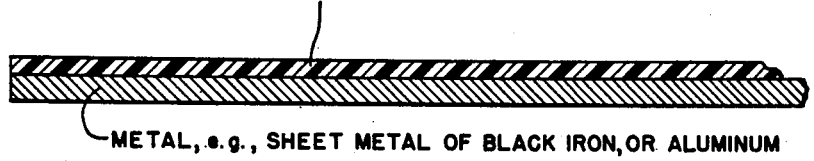
Figure 2:

FIGURE 1 of the drawing shows a section of portion of a finished article such as sheet metal, carrying a cured coating of the polymer of the invention. FIGURE 2 shows a section of tinplate bearing the cured coating.

The monoolefinic, monocarboxylic acids used in preparing the copolymers of the invention are $\alpha,\beta$-unsaturated acids corresponding to the formula

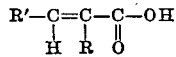

wherein R and R' may be the same or different and are radicals selected from the group consisting of hydrogen, alkyl, and aryl. Thus, the radicals R and/or R' may be hydrogen, methyl, ethyl, propyl, or phenyl, for example. Preferably, acrylic or $\alpha$-methylacrylic (hereinafter called methacrylic) acid is utilized. Other useful acids include crotonic, isocrotonic, $\beta$-ethylacrylic, isohydrosorbic, and cinnamic.

The polymer is prepared by reacting the comonomers, consisting of about 80 to 99% butadiene, with about 20 to 1% by weight of an acid corresponding to the above formula, using an inert organic solvent, certain organic peroxide initiators or catalysts, and moderately elevated temperatures. An unsaturated polymer having desirable characteristics, including definite unsaturation types and proportions thereof, is obtained. Between about 15 and 35% of the polymer weight is attributed to the acid, in the case of methacrylic acid. The molar ratio of the acid of the above formula, to butadiene, in the polymer, is between about 1 to 4 and 1 to 2, as determined by infrared spectroscopic data. Other methods, including titration and calculations based on carbon and hydrogen determinations, are useful to indicate the acid monomer content of the polymer. As is customary in the art, percentages based on carbon and hydrogen determinations and on titration are on a weight basis, and those obtained by infrared spectroscopy are on a volume basis. Quantitative values ascertained by the latter method are approximations, but are sufficiently reliable as a control technique to determine important polymer properties on a reproduceable basis. Such infrared data is of particular benefit in comparing unknowns with known molecular configurations, as in determining carbonyl content by comparison with a butyl acetate standard, or in establishing proportions of unsaturation types and ratios of one unsaturation type to another.

The polymer is applied to metallic substrates such as sheets or preformed articles and cured preferably in the presence of oxygen, with heat if desired, forming an exceptional resinous coating which is hard, flexible and chemically resistant. The coated articles may be used as such or subsequently mechanically formed into other articles.

This invention resides partially in the discovery that copolymers of butadiene and the above acids prepared under the conditions of this invention, are markedly superior to somewhat similar polymers prepared by other methods. The polymers of this invention are believed to have distinctive macromolecular structures, both in the uncured, and cured, solid forms of polymer. This distinctive structure is one reason for the superiority of the final coatings obtained. Relevant details of the molecular structure are indicated by the types and the ratios of unsaturation types in the uncured polymer, which are dictated by the monomers utilized, polymerization conditions, and similar features.

"Butadiene" refers to 1,3-butadiene as is conventional. The monomers need not be absolutely pure; materials which inhibit the reaction should be absent, but if present, should be present in minimum amounts.

Throughout the specification, all parts are by weight, unless otherwise noted.

Polymerization conditions are variable but generally are within limits which are critical. Useful catalysts or initiators include benzoyl peroxide, t-butyl hydroperoxide, cumene hydroperoxide, t-butyl perbenzoate, acetyl peroxide, similar peroxy compounds which are soluble in the reaction diluent or solvent, and mixtures thereof. The quantity of peroxide varies between about 0.1 and 5%, preferably between about 0.5 and 2%, based on the weight of the monomers. The time is between about 1 and 20 hours, and in general, is varied inversely with temperature. Elevated temperatures of 50 to 200° C. are useful although about 100 to 150° C. is preferred. Solvents are desirably utilized, and inert, non-polar solvents are preferred. Useful solvents are those which do not react with the monomers, are inert to the catalyst, and do not polymerize in this reaction. Included are ligroin, benzene, xylene, cyclohexane, toluene, pentane, hexane, heptane, 1,4-dioxane, petroleum ether, and similar compounds or mixtures thereof. Other solvents including acetone and methyl ethyl ketones may be used, alone or mixed with the above solvents. The preferred ratio of solvent or diluent to comonomers, by weight, is between 1 to 1 and 3 to 1 although higher ratios such as 5 to 1 and lower ratios such as 1 to 2 may be used. The pressure is the autogenous pressure developed by the system, and is preferably between about 100 and 300 p.s.i.a. Higher and lower pressures are useful, for example, from about 20 to about 1,000 p.s.i.a. may be used.

Post-polymerization treatment of the polymer solution includes separating the gaseous from the liquid fluids in the reactor, separating unreacted acid if any, followed by polymer isolation. The polymer solution is preferably heated under vacuum to remove the solvent and obtain the pure polymer. In the event the solvent is one known to be useful in the coating operation and the polymer does not have a low enough viscosity for application as a coating with no solvent present, at least a part of the solvent may be retained with the polymer dissolved therein. Alternatively, the polymer solution may be treated with an excess of methanol, for instance three times the volume of the solution, which precipitates the polymer. The precipitated polymer is then isolated for example by decantation and by evaporation of the remaining solvent and methanol. This latter method removes any methanol-soluble fractions present.

The polymer at about 20° C. is preferably an oily liquid having curing properties of drying oils; it is less desirably in the form of a soluble solid or semi-solid. In any event, the polymer must be curable to a resinous state as described herein. The intrinsic viscosity of the polymer is preferably between 0.1 and 0.5 deciliter per gram at 100° F. In utilizing the polymer, the viscosity of the liquid polymer or of a polymer solution of the liquid, semi-solid, or solid polymer, may, for example, be between 1000 and 5000 centistokes at 25° C. Higher and lower values are useful for some applications, since it is known that polymers having viscosities ranging from 3 to 100,000 centistokes at 25° C. may be applied as coatings. Polymer solvents, if used, may be the same as any of the reaction diluents listed above, although higher boiling materials such as xylene are preferred.

The polymerization process may be conducted in batches or continuously, and with or without stirring or agitation.

The macromolecular structure of the polymers according to this invention is relatively constant or reproducible as defined by the amounts and quantitative ratios of saturation types, total determinable unsaturation, and the ratios of monomers in the reaction mixture. "Unsaturation types" as the term is used herein refers to the mode of substitution of hydrogen and carbon atoms about a carbon to carbon double bond, i.e.

Cis
$$-\overset{H}{\underset{|}{C}}-\overset{H}{\underset{|}{C}}=\overset{}{\underset{|}{C}}-\overset{}{\underset{|}{C}}-$$

Trans
$$-\overset{}{\underset{|}{C}}-\overset{H}{\underset{|}{C}}=\overset{}{\underset{|}{C}}-\overset{}{\underset{|}{C}}-\underset{H}{}$$

Monosubstituted vinyl (monosubstituted ethylene) 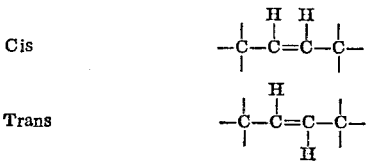

Tetrasubstituted vinyl (tetrasubstituted ethylene) 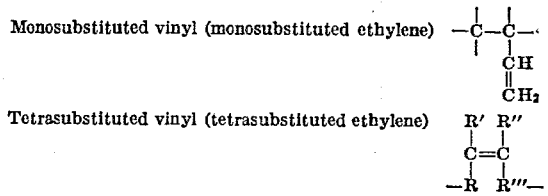

This terminology is also described in part in Chemical and Engineering News, vol. 37, No. 12, page 59, March 23, 1959. Absorptivity data for the determination of the several olefin types were from the spectra obtained prior to the determination described herein from known olefins. These absorptivities confirmed those reported in the literature, e.g., McMurry, H. L., and Thornton, Vernon, "Correlation of Infrared Spectra of Paraffins, Olefins, and Aromatics with Structure," Analytical Chemistry, vol. 24, pages 318–34 (1952). It has been postulated that variable amount of cyclization takes place in butadiene polymers; however, tetrasubstituted vinyl unsaturation is not readily ascertainable by infrared data. The quantities of the several types of unsaturation were determined from infrared spectra at wave lengths of 10.98±0.2 microns for monosubstituted vinyl unsaturation, 10.34±0.2 microns for trans unsaturation, and about 14 microns for cis unsaturation. Absorptivities for these determinations were:

| | Liters/mole-cm. |
|---|---|
| Cis | 92 |
| Trans | 118 |
| Monosubstituted vinyl | 149 |

The infrared spectrometer used was a Baird, Model 455. It is believed that the cis and trans unsaturation types are the result of 1,4 addition.

Amounts of such unsaturation types as determined by infrared spectroscopy on the polymer according to this invention are in the following approximate ranges:

| | Mole/100 g. |
|---|---|
| Cis | 0.05–0.20 |
| Trans | 0.5–0.6 |
| Monosubstituted vinyl | 0.01–0.1 |

Unsaturation by chemical titration was not determined in all cases, but suitable values are suggested by the examples below, wherein unsaturation as determined by iodine or iodine monobromide titration are as low as 0.65 mole per 100 g. of polymer, and as high as 1.42 moles per 100 g. Total unsaturation according to infrared analyses ranges from about 0.6 to about 0.8 mole/100 g. The qualities of the adherent, hard, flexible, cured coating are believed due in large part to the structure of the curable polymer as defined above. The following are representative of the methods for preparing the polymers of this invention, useful to form cured resinous coatings upon metal, all parts being by weight in the examples and elsewhere herein, unless indicated otherwise:

EXAMPLE 1

Butadiene, 84 parts, and methacrylic acid, 16 parts, were introduced into a chilled Pyrex reaction bottle with 56 parts chilled xylene and 4 parts benzoyl peroxide initiator, all parts being by weight. The bottle was sealed and turned end-over-end for 18 hours while being held at a temperature of 100° C.

After the reaction, the polymer was precipitated in about 500 ml. of methanol, approximately 3 times the volume of the reaction mixture. The precipitated polymer was recovered by decantation and dried under vacuum. The iodine number of the gel-like polymer was 288, corresponding to unsaturation of about 1.12 moles/100 g. of polymer. The acid number was 150, corresponding to a methacrylic acid content of 23%. The polymer was soluble in xylene.

EXAMPLE 2

Larger batches of polymer were made in a one gallon stirred autoclave in this example. Five batches designated A, B, C, D and E were run.

The reactants, butadiene and methacrylic acid, were employed in the ratio of about 84:16, respectively. Four percent of the total weight of reactants was equal to the weight taken as the initiator, benzoyl peroxide. The total weight of reactants and initiator were then equal to 65 weight percent of the total charge, the remaining 35 percent being the solvent, xylene.

Benzoyl peroxide was dissolved in the xylene with the methacrylic acid and the solution was charged to the autoclave. The butadiene was introduced and the autoclave was sealed and then heated to 100° C.±1° C. for the times shown in Table I.

At the end of this time the contents of the autoclave were cooled to 50° C. and most of the unreacted butadiene vented into a Dry-Ice-cooled pressure bomb together with some by-products and solvent. When the pressure had decreased to near atmospheric, the contents of the autoclave were removed.

The polymer solutions from experiments 2A and 2D were treated with and precipitated by three times their own volumes of methanol. The polymers, wet with xylene and methanol, were dried by reduced pressure in a "Rinco" spin-drier. The polymers at this point were gel-like. Samples were analyzed for carbon and hydrogen. The remainder was dissolved in xylene. Samples of the xylene solutions were analyzed for unsaturation, acid number, carbonyl content, and intrinsic viscosities.

The polymer solutions from Examples 2B and 2C were combined and divided into two equal portions. Both were treated with three times their own volumes of methanol. The wet polymers were treated with sufficient hydroquinone to give: 20 p.p.m. for 2B and 100 p.p.m. for 2C in the solvent-free polymer. A sample of the polymer containing 20 p.p.m. hydroquinone was analyzed for carbon and hydrogen. The remainders of the two batches were dissolved in weights of xylene equal to their own weights. The hydroquinone inhibited gel formation in the liquid polymers, and other polymerization inhibitors are similarly useful.

The fifth preparation of this copolymer, Example 2E, was processed in the same manner as the one described above with 20 p.p.m. hydroquinone.

Analysis of the methacrylic acid content by carbonyl analysis, by infrared spectroscopy, and acid titration were made.

The results for the percent methacrylic acid in the polymer as determined by carbon-hydrogen analysis and by percent carbonyl by infrared compare well one with the other.

Analysis for unsaturation was made by infrared spectroscopy. The figures given for unsaturation (types) indicate a constancy of composition regardless of the degree of gel formation.

Table I gives the polymerization conditions and Table II gives polymer characteristics.

Table I

| Example 2 | Reaction time hrs | Materials charged, in grams | | | |
|---|---|---|---|---|---|
| | | Buta-diene | Meth-acrylic acid | Benzoyl Peroxide | Xylene |
| A | 2 | 1,000 | 190 | 48 | 666 |
| B | 18 | 1,000 | 190 | 48 | 666 |
| C | 17 | 580 | 100 | 27 | 435 |
| D | 2 | 905 | 172 | 48 | 666 |
| E | 18 | 1,000 | 190 | 48 | 666 |

Table II
[Temperature 100° in all runs]

| Example 2 | C and H, percent avg. of 2 detns. | | Unsatn. by I.R.[1] moles/100 g. | | | | C=O, I. R., Mole/100 g.[2] | Methacrylic acid, percent | | |
|---|---|---|---|---|---|---|---|---|---|---|
| | C percent | H per cent | trans C=C | Cis C=C | Mono subs. vinyl | Total | | By C and H | By titration | By C=O I.R. |
| A | 79.24 | 9.68 | 0.58 | 0.16 | 0.02 | 0.76 | 0.25 | 29.8 | 31 | 43 |
| B[3] | 79.05 | 9.45 | 0.57 | 0.13 | 0.06 | 0.76 | 0.17 | 30.9 | [4] 34 | 29 |
| C[5] | | | Analysis of sample should be the same as above | | | | | | | |
| D | 78.01 | 9.64 | 0.50 | 0.13 | 0.02 | 0.65 | 0.18 | 33.2 | 24 | 31 |
| E[3] | | | 0 53 | 0.08 | 0.06 | 0.67 | 0.17 | | | 29 |

[1] Infrared spectroscopy is indicated by "I.R."
[2] Butyl acetate standard.
[3] 20 p.p.m. hydroquinone.
[4] This value is high, an improved technique gave 28%.
[5] 100 p.p.m. hydroquinone.

The polymers of Example 2 were analyzed, using approximately a 50% by weight xylene solution, for total chemically determinable unsaturation, using IBr, and for viscosity, with the following results:

Table III

| Polymer Example 2 | Moles/100 g. unsaturation, solvent-free basis; IBr | Intrinsic viscosity, dl./g. (100° F.) |
|---|---|---|
| A | 0.94 | 0.193 |
| B (20 p.p.m. hydroquinone) | | 0.16 |
| D | 0.65 | |
| E | 1.12 | 0.195 |

Polymer 2C was not evaluated since it was the same as polymer 2B except it contained 100 p.p.m. of hydroquinone.

EXAMPLE 3

Reactions similar to Example 2 were conducted in a one gallon stirred autoclave, varying the conditions as indicated in Table IV.

Table IV

| Expt. No. 3 | Charge weights | | | | Reaction | |
|---|---|---|---|---|---|---|
| | Buta-diene, g. | Solvent, g. | Metha-crylic acid g. | Benzoyl peroxide, g. | Temp., °C. | Time, hrs. |
| A | 865 | Naphtha, 545 | 98 | 29.3 | 100 | 18 |
| B | 995 | M.E.K.[1], 605 | 111 | 11 | 100 | 2 |
| C | 950 | Xylene, 580 | 106 | 21.1 | 100 | 18 |
| D | 1,014 | Xylene, 676 | 193 | 48 | 100 | 18 |

[1] Methyl ethyl ketone.

The characteristics of the polymers of Example 3 were comparable to those of the polymers of Example 2. Polymer 3D had a methacrylic acid content of 23.3% as determined by carbon and hydrogen analysis, which is lower than the polymers of Example 2.

EXAMPLE 4

Acrylic acid, 30 parts, was reacted with 70 parts butadiene, using 7 parts benzoyl peroxide initiator and 63 parts dioxane solvent, at 100° C. for 18 hours using the reaction and polymer recovery steps of Example 1. The liquid polymer had an iodine number of 288, corresponding to an unsaturation of 1.12 moles/100 g., a viscosity, in centistokes at 50° C., of 3920, and an acid number of 140, corresponding to 14% by weight of copolymerized acrylic acid.

EXAMPLE 5

Acrylic acid, 15 parts, was reacted with 85 parts of butadiene in the presence of 4 parts benzoyl peroxide and 56 parts xylene, using the polymerization and polymer recovery steps of Example 1. The reaction was conducted for 18 hours at 100° C. The iodine number was 366, corresponding to an unsaturation value of 1.42 moles/100 g. The acid number of 55 indicates that the polymer contained 7% by weight of copolymerized acrylic acid.

EXAMPLE 6

Crotonic acid, 30 parts, was reacted with butadiene, 70 parts, in the presence of 4 parts benzoyl peroxide and 108 parts xylene, at 100° C. for 18 hours. The reaction and polymer recovery procedures were in general similar to those of Example 1, except that the materials were introduced into a cooled stainless steel bomb, which was then heated with no agitation.

The acid number of the polymer was 41, indicating 6.3% copolymerized crotonic acid, based on polymer weight.

This invention also comprises coating a metal surface with the polymer as defined above and curing the coating preferably in the presence of air or oxygen, and preferably by baking. In the case of a flat metal article such as tin plate, the polymer, for example as a 50% solution of nonvolatile (N.V.) solids in xylene, may be roller coated by conventional procedures. Best results are obtained if more than about 30% N.V. is used. Other coating methods may be used, including brushing, spraying, and immersing or dipping an article in the polymer composition, the viscosity of the compounded polymer being related to the coating method used. The coatings may be applied to flat sheet metal, followed by curing, then by forming the desired article. Alternatively, a previously formed article such as a can may be coated, and the coating then cured. Preferably the polymer coating is cured in the presence of air at temperatures between about 150° C. and about 500° C. for a period of between about 0.1 second and about 15 minutes. Other temperatures, for example still lower temperatures, are useful with adjustment of the time for curing. In addition to conventional baking ovens, using radiated heat for example, induction heating may be used. Hot natural gas combustion products, comprising air, may come into direct contact with the coating being cured. The mechanism of curing is analogous to that of natural drying oils, and involves oxidation, further polymerization, and cross-linking of the synthetic drying oil or polymer.

By way of illustration, the description as to a metal substrate is directed primarily to electrolytic tin coatings upon ferrous metal, black iron, and aluminum, although other metals are useful as hereinafter set forth. A particularly important area of application of this invention is in the can lining art.

Some of the problems encountered in obtaining satisfactory can linings are apparent in that resinous linings must be resistant to can contents, alkalies, acids, moisture, and solvents. They must be non-toxic, odor free, and develop no flavors on standing. Processing of the can after applying the coating, involving fabrication, cutting or stamping and the formation of seams, including steps such as soldering, causes many lining materials to fail. The can may be processed along with its contents for periods of an hour or more at temperatures of 200° to 400° F., the canned products stand for one to two years before being used, and any deterioration of the container may contaminate the contents. Accordingly, one of the more important objects of the invention is to provide superior can linings.

In addition to can linings the process and product of the present invention include applications such as protective and decorative coatings on articles of hardware such as door knobs, electrical insulation, varnishes, and protective coatings for metals in general.

The particular metal articles useful in this invention are prepared by known methods. Thus conventional tinplate is prepared by electroplating using an aqueous electrolyte to obtain a layer of tin of about 0.03 mil thickness or ¼ pound tin per base box. A base box is the area of 112 sheet metal plates 14 inches by 20 inches equal to 217.78 sq. ft., 20.232 sq. meters, or 31,360 sq. inches. The tinplate may also be ½ pound electro tinplate, and may vary from about ⅛ pound to 10 pounds or more per base box. The surface may be so-called bright tin or may contain an oxide coating anodically or otherwise produced. The oxide coating, if present, may be transparent or opaque. Tinplate coated by hot-dip methods is useful. For the production of black steel or iron conventional treatments include hot aqueous solutions of alkaline compounds such as sodium hydroxide and alkali metal nitrates and nitrites, in which case a black oxide coating is obtained. Other metal surfaces are useful in this invention. For example, aluminum, rolled, "spun," or otherwise formed, may be coated without further treatment or may have an anodically produced aluminum oxide coating thereupon, which in turn may be a porous oxide or may be sealed with hot water, steam, or various nickel, cobalt, or other salts. In addition, steel, zinc, galvanized ferrous metal, copper, brass, and other metal surfaces are useful in the process of this invention and to obtain the products of this invention.

The liquid film is between 0.005 and 75 mils in thickness, preferably between 0.1 and 2.0 mils, and has a nonvolatile polymer content of from 10% to 100%, preferably 50% to 60% as a minimum. The dry film is between about .005 and 50 mils in thickness, and preferably is present in an amount corresponding to 2 to 7 mg./sq. in., although not limited generally to this weight, the approximate operable range for most uses being 0.3 to 50 mg./sq. in.

A typical procedure used to apply coatings of the polymers to metal products and to test polymers is to dilute the polymer to 50% non-volatiles (N.V) in xylene if necessary, and to utilize a drawbar to manually apply a liquid film of polymer, or polymer in solution, 1 mil or 1½ mils thick, the metal substrate being ¼ pound electrolytic tinplate.

In curing the polymer identical test blanks were subjected to different temperatures, in the presence of air, being approximately 350° F. and 400° F. maximum metal temperature. The articles were subjected to these temperatures for a period of ten minutes.

Some of the objective and subjective tests of the cured coatings on tinplate may be defined as follows:

(I) Wedge bend; five pound weight dropped on wedge of varying sharpness which is placed against a coated sheet of tinplate cured as above and bent generally into a U-shape with the wedge placed in the trough formed thereby. This measures the adhesion, flexibility, and impact resistance of the film, and simulates the formation of a side seam in a can forming operation. Evalution of this test is performed by immersing the article in a solution of copper sulfate treated to plate copper onto the exposed metallic surface. A score of 100 is perfect.

(II) 202 can end fabrication; testing of a can end assembled from tinplate having a cured polymer coating which is placed in copper sulfate solution as above. This measures adhesion and abrasion resistance of a can end double seam, and is rated good, fair, poor or numerically.

(III) Boiling water; the cured coated article is placed in boiling water to obtain an indication of the ability of the film to withstand high temperature processes. Any whitening of the film is called blushing, and any peeling of the film is noted. If the film is satisfactory in this test, it is rated as "passing" the test.

Other tests, such as the conventional pencil "hardness" tests, evaluations of the appearance, dry properties such as tackiness or lack thereof, integrity of the film peeled or scraped from the substrate, adherence to the substrate, and acetone resistance are useful and were employed.

EXAMPLE 7

The semi-solid and liquid polymers prepared as in Examples 1–6 above were diluted with solvent, applied to ¼ pound box basis electrolytic tinplate sheets as a 1 mil wet film, baked in the presence of air at the indicated temperatures in degrees centigrade for ten minutes, and evaluated.

The solvents used for diluting and applying representative polymers as coatings, the proportion of polymer (percent non-volatiles or N.V. by weight), and the solution viscosities were as given in Table V. The fabrication properties are indicated by the values appearing in Table VI. The example number in the tables, where given, designates the polymer of the above examples.

Table V

| Polymer of Example No. | Solvent | Approximate percent N.V. | Viscosity No. 4 Ford cup at 77° F., seconds |
|---|---|---|---|
| 1 | Xylene | 50 | |
| 2A | do | 46 | |
| 2B | 80% isophorone, 10% butanol, 10% xylene, by volume. | 19 | 35 |
| 2C | do | 19 | 35 |
| 2D | Xylene | 39 | (1) |
| 2E | 80% isophorone, 10% butanol, 10% xylene, by volume. | 16 | 35 |
| 3A | 50% methyl isobutyl ketone, 50% xylene by volume. | 32 | 45 |
| 3B | do | 30 | 46 |
| 3C | do | 33 | 37 |
| 4 | Xylene | 50 | |
| 5 | do | 50 | |
| 6 | do | 50 | |

1 Viscosity of Z4 on Gardner-Holdt tube.

Table VI

| Polymer of Example No. | Wedge bend test | | 202 can end test | |
|---|---|---|---|---|
| | 350° | 400° | 350° | 400° |
| 1 | 63 | 66 | 80 | 75 |
| 2A | 76 | 62 | 70 | 55 |
| 2B | 55 | 45 | 45 | 30 |
| 2C | 45 | 30 | 40 | 25 |
| 2D | 55 | 55 | 65 | 50 |
| 2E | 25 | 40 | 45 | 30 |
| 3A | 60 | 44 | 55 | 40 |
| 3B | 70 | 49 | 65 | 45 |
| 3C | 65 | 49 | 60 | 40 |
| 4 | 66 | 66 | 60 | 60 |
| 5 | 85 | 58 | 85 | 75 |

The crotonic acid copolymer of Example 6 gave results somewhat below the values in Table VI for the methacrylic acid or acrylic acid copolymers. All of the coatings passed the boiling water test, the tabulated tests above being representative of the general physical qualities of the coated panels. The appearance and general physical properties of the coatings including integrity, adhesiveness, and acetone resistance were good to excellent.

An important advantage is that commercial tinplate may generally be used without preliminary removal of oily coatings commonly present. In some cases, however, undissolved gel in the polymer or some other factor seems to cause "eyeholes" to appear in the coating. The eyeholes where they appear may be eliminated readily by purifying the polymer, or compounding the polymer with various materials, including vinyl type polymers such as polyvinyl butyral, silicone oils and resins, natural drying oil type polymers, "Cellosolve" plasticizers, ethyl cellulose, aluminum isopropylate and 2-ethylhexanol, pine oil, and/or various wetting agents.

Using black iron (CMQ Black Plate) in place of the tin-plated sheet of Example 7, similar results were obtained. Superior results were obtained using aluminum in place of the substrate of Example 7.

The polymers of the invention are amendable to improvement or adaptation for specific application by the use of compounding ingredients. Thus, driers such as manganese and cobalt phthalates and oleates are sometimes useful, as are natural drying oils, fillers, pigments, and plasticizers. Known after-treatments may be applied to chemically modify the polymer properties.

I claim:
1. A metal article having a surface thereof coated with a flexible, adherent, resinous layer of a copolymer prepared from a monomer mixture consisting essentially of about 80 to 99% butadiene and about 1 to 20% by weight of an acid of the formula

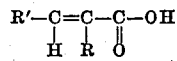

wherein R and R' are radicals selected from the group consisting of hydrogen, alkyl, and aryl, said copolymer prior to curing being a liquid polymer and having drying properties, having about 0.05 to 0.20 mole/100 g. of cis unsaturation, about 0.5 to 0.6 mole/100 g. of trans unsaturation, and about 0.01 to 0.1 mole/100 g. of monosubstituted vinyl unsaturation, and the polymer composition being such that the ratio of acid of the above formula to butadiene is less than about 1 to 2, as determined by infrared spectroscopic data.

2. The article of manufacture of claim 1 wherein said article is a container.

3. The article of claim 1 in which said acid comprises acrylic acid.

4. The article of claim 1 in which said acid comprises methacrylic acid.

5. A process of preparing a metal article having a resinous coating thereupon comprising the steps of coating a metal surface with a liquid polymer comprising a substantial proportion of a copolymer prepared from a monomer mixture consisting essentially of about 80 to 99% butadiene and about 1 to 20% by weight of an acid of the formula

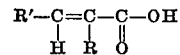

wherein R and R' are radicals selected from the group consisting of hydrogen, alkyl, and aryl, said copolymer prior to curing having drying properties, having about 0.05 to 0.20 mole/100 g. of cis unsaturation, about 0.5 to 0.6 mole/100 g. of trans unsaturation, about 0.01 to 0.1 mole/100 g. of monosubstituted vinyl unsaturation, the polymer composition being such that the ratio of acid of the above formula to butadiene is less than about 1 to 2, as determined by infrared spectroscopic data and curing the coating to a resinous state.

6. The process of claim 5 in which said acid comprises acrylic acid.

7. The process of claim 5 in which said acid comprises methacrylic acid.

8. A process of preparing a metal article having a protective coating thereupon comprising the steps of reacting at an elevated temperature of between about 100° C. to about 200° C. for a finite time up to about 20 hours, a composition comprising an organic peroxy catalyst and a monomer mixture consisting essentially of about 80 to 99% butadiene and about 1 to 20% of an acid of the formula

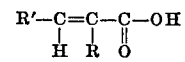

wherein R and R' are radicals selected from the group consisting of hydrogen, alkyl, and aryl, recovering a polymer having drying properties and about 0.05 to 0.20 mole/100 g. of cis unsaturation, about 0.5 to 0.6 mole/100 g. of trans unsaturation, and about 0.01 to 0.1 mole/100 g. of monosubstituted vinyl unsaturation, the polymer composition being such that the ratio of acid of the above formula to butadiene is less than about 1 to 2, as determined by infrared spectroscopic data, then applying as a coating upon a surface of said metal, a liquid composition comprising a substantial proportion of said polymer, and curing the coating to a flexible resinous, adherent film.

9. The process of claim 8 in which said acid comprises acrylic acid.

10. The process of claim 8 in which said acid comprises methacrylic acid.

11. The process of claim 8 in which the metal is in the form of a substantially flat sheet, and in which a container is mechanically formed from said sheet after curing said coating.

12. A method of preparing an unsaturated copolymer having drying properties comprising the steps of reacting, at an elevated temperature of between about 100° C. and about 200° C. for a finite time up to about 20 hours, in the presence of an organic peroxy catalyst, a monomer mixture consisting essentially of a preponderant amount of butadiene and a minor amount of an acid of the formula

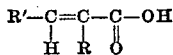

in which R and R' are radicals selected from the group consisting of hydrogen, alkyl, and aryl, controlling said reaction to obtain a polymer having about 0.05 to 0.20 mole/100 g. of cis unsaturation, about 0.5 to 0.6 mole/100 g. of trans unsaturation, and about 0.01 to 0.1 mole/100 g. of monosubstituted vinyl unsaturation, so that the polymer composition is such that the ratio of acid of the above formula to butadiene is less than about 1 to 2, as determined by infrared spectroscopic data and recovering said polymer.

13. The method of claim 12 in which said acid comprises acrylic acid.

14. The method of claim 12 in which said acid comprises methacrylic acid.

15. The process of claim 12 in which said temperature is between about 100° C. and 150° C.

16. The process of claim 12 in which the recovered polymer is in the liquid state at room temperature.

17. An unsaturated copolymer having drying properties consisting essentially of a major proportion of butadiene polymerized with a minor proportion of an acid of the formula

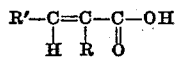

in which R and R' are selected from the group consisting of hydrogen, alkyl, and aryl, in which said unsaturation comprises about 0.05 to 0.20 mole/100 g. of cis unsaturation and about 0.5 to 0.6 mole/100 g. of trans unsaturation, and the polymer composition being such that the ratio of acid of the above formula to butadiene is less than about 1 to 2, as determined by infrared spectroscopic data.

18. The polymer of claim 17, in which the composition is essentially solvent-free and is a liquid at room temperature.

19. The copolymer of claim 17 in which said acid comprises acrylic acid.

20. The copolymer of claim 17 in which said acid comprises methacrylic acid.

References Cited in the file of this patent
UNITED STATES PATENTS

| | | |
|---|---|---|
| 2,205,883 | Graves | June 25, 1940 |
| 2,692,841 | Frank et al. | Oct. 26, 1954 |
| 2,768,908 | Cull | Oct. 30, 1956 |
| 2,774,703 | Reynolds | Dec. 18, 1956 |
| 2,876,207 | Henderson | Mar. 3, 1959 |
| 2,894,857 | Uraneck et al. | July 14, 1959 |
| 2,952,565 | Contois et al. | Sept. 13, 1960 |

FOREIGN PATENTS

| | | |
|---|---|---|
| 707,425 | Great Britain | Apr. 14, 1954 |

OTHER REFERENCES

Alfrey et al.: Journal Am. Chemical Soc., vol. 68, pages 2464–7 (1946).